(12) United States Patent
Katsumata et al.

(10) Patent No.: US 11,646,942 B2
(45) Date of Patent: May 9, 2023

(54) SLICE OPERATION DEVICE, COMMUNICATION SYSTEM, AND SLICE OPERATION METHOD

(71) Applicant: NTT DOCOMO, INC., Tokyo (JP)

(72) Inventors: Yuki Katsumata, Tokyo (JP); Kouji Tsubouchi, Tokyo (JP); Shigeru Iwashina, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 129 days.

(21) Appl. No.: 17/266,365

(22) PCT Filed: Aug. 9, 2018

(86) PCT No.: PCT/JP2018/029914
§ 371 (c)(1),
(2) Date: Feb. 5, 2021

(87) PCT Pub. No.: WO2020/031328
PCT Pub. Date: Feb. 13, 2020

(65) Prior Publication Data
US 2021/0314230 A1   Oct. 7, 2021

(51) Int. Cl.
*H04L 41/0896* (2022.01)
*H04L 41/0806* (2022.01)
(Continued)

(52) U.S. Cl.
CPC ...... *H04L 41/0896* (2013.01); *H04L 41/0806* (2013.01); *H04L 41/5041* (2013.01); *H04L 43/0876* (2013.01)

(58) Field of Classification Search
CPC ............ H04L 41/0896; H04L 41/0806; H04L 41/5041; H04L 43/0876; H04L 47/40;
(Continued)

(56) References Cited

U.S. PATENT DOCUMENTS

| | | | |
|---|---|---|---|
| 10,841,236 B1* | 11/2020 | Jin | G06N 20/00 |
| 2005/0216590 A1* | 9/2005 | Aubin | H04L 47/70 709/226 |

(Continued)

FOREIGN PATENT DOCUMENTS

WO   2016/152588 A1   9/2016

OTHER PUBLICATIONS

International Preliminary Report on Patentability for corresponding International Application No. PCT/JP2018/029914, dated Feb. 18, 2021 (6 pages).
(Continued)

*Primary Examiner* — Madhu Woolcock
(74) *Attorney, Agent, or Firm* — Osha Bergman Watanabe & Burton LLP

(57) ABSTRACT

A slice operation device managing a plurality of slices to each of which a service using the virtual network is allocated, the slice operation device including: a slice information holding unit configured to hold allowable diversion degree information that is information on a resource amount which can be diverted to transmission and reception using a slice different from a slice in question, among resources regarding the slice in question, the allowable diversion degree information being held for each of the plurality of slices; and a signal control unit configured, in a case where resources of one of the plurality of slices are insufficient, to cause resources of a slice different from the slice whose resources are insufficient to be diverted to transmission and reception of a signal using the slice whose resources are insufficient, based on the allowable diversion degree information held by the slice information holding unit.

8 Claims, 6 Drawing Sheets

(51) Int. Cl.
 *H04L 41/5041* (2022.01)
 *H04L 43/0876* (2022.01)
(58) Field of Classification Search
 CPC ............. H04L 41/0895; H04L 41/5054; H04L 41/0893
 USPC .......................................................... 709/226
 See application file for complete search history.

(56) References Cited

U.S. PATENT DOCUMENTS

| | | | | |
|---|---|---|---|---|
| 2011/0179422 A1* | 7/2011 | Stegaru | ............... | G06F 11/3006 718/104 |
| 2012/0166653 A1* | 6/2012 | Twitchell | ................ | H04L 12/56 709/227 |
| 2014/0229941 A1* | 8/2014 | Bert | .................... | G06F 9/45558 718/1 |
| 2015/0358399 A1* | 12/2015 | Baugher | ................. | H04L 41/40 709/203 |
| 2015/0358829 A1* | 12/2015 | Arnott | ................... | H04W 72/06 455/454 |
| 2016/0183286 A1* | 6/2016 | Park | ...................... | H04W 72/21 370/329 |
| 2016/0292007 A1* | 10/2016 | Ding | ..................... | G06F 9/5077 |
| 2016/0380909 A1* | 12/2016 | Antony | ................. | H04L 47/805 370/236 |
| 2017/0257870 A1* | 9/2017 | Farmanbar | ........ | H04W 28/0247 |
| 2017/0310435 A1* | 10/2017 | Wei | ....................... | H04L 5/0007 |
| 2018/0034743 A1* | 2/2018 | Dintenfass | .......... | H04L 43/0876 |
| 2018/0132117 A1* | 5/2018 | Senarath | ............... | H04W 24/02 |
| 2018/0219794 A1* | 8/2018 | Patil | ...................... | H04L 47/745 |
| 2019/0258530 A1* | 8/2019 | Moldvai | ................. | G06F 9/485 |
| 2019/0281494 A1* | 9/2019 | Chan | ..................... | H04W 24/08 |
| 2021/0282082 A1* | 9/2021 | Mildh | ................. | H04W 68/005 |

OTHER PUBLICATIONS

International Search Report issued in Application No. PCT/JP2018/029914, dated Oct. 30, 2018 (5 pages).
Written Opinion issued in International Application No. PCT/JP2018/029914, dated Oct. 30, 2018 (3 pages).

* cited by examiner

Fig. 3

| SST(S-NSSAI) | SD(S-NSSAI) | REQUIREMENT A (DELAY) | REQUIREMENT B (BANDWIDTH) | REQUIREMENT ... | ALLOWABLE RESOURCE DIVERSION DEGREE |
|---|---|---|---|---|---|
| 1 | - | 40ms | 2Mbps | ... | 30% |
| 2 | 10 | 10ms | 200kbps | ... | 0% |
| ... | ... | ... | ... | ... | ... |
| 5 | 20 | 200ms | 20kbps | ... | 50% |

SLICE OPERATION DEVICE, COMMUNICATION SYSTEM, AND SLICE OPERATION METHOD

TECHNICAL FIELD

The present disclosure relates to a slice operation device, a communication system, and a slice operation method.

BACKGROUND ART

A network system using existing virtualization technology virtually divides hardware resources to create slices, which are virtual networks logically constructed on a network infrastructure. The system then allocates a service to each of the slices and thereby can provide the service by using a network of each of the slices that are isolated from one another. Therefore, in a case of allocating a slice to each of services having a variety of requirements, it is possible to easily satisfy the requirement of each service and thereby reduce the signaling processing and the like of the slice.

CITATION LIST

Patent Literature

Patent Literature 1: WO 2016/152588

SUMMARY OF INVENTION

Technical Problem

However, once a predetermined amount of resources is allocated to each slice, a change in allocation is not assumed. Therefore, there may be a situation where resources cannot be sufficiently utilized even though there are plenty of resources in the slices as a whole.

The present disclosure has been made in view of the above, and an object of the present invention is to provide a slice operation device, a communication system, and a slice operation method improved in utilization of resources allocated to a slice.

Solution to Problem

A slice operation device according to an aspect of the present disclosure is a slice operation device managing a plurality of slices each of which is a virtual network constructed on a network infrastructure and to each of which a service using the virtual network is allocated, the slice operation device including: a slice information holding unit configured to hold allowable diversion degree information that is information on a resource amount which can be diverted to transmission and reception using a slice different from a slice in question, among resources regarding the slice in question, the allowable diversion degree information being held for each of the plurality of slices; and a signal control unit configured to cause, in a case where resources of a slice among the plurality of slices are insufficient, resources of a slice which is different from the slice whose resources are insufficient to be diverted to transmission and reception of a signal using the slice whose resources are insufficient, based on the allowable diversion degree information held by the slice information holding unit.

A communication system according to an aspect of the present disclosure is a communication system including: a slice operation device configured to manage a plurality of slices each of which is a virtual network constructed on a network infrastructure and to each of which a service using the virtual network is allocated; and a node configured to transmit a signal regarding user data to one of the plurality of slices managed by the slice operation device, the slice operation device including: a slice information holding unit configured to hold allowable diversion degree information that is information on a resource amount which can be diverted to transmission and reception using a slice different from a slice in question, among resources regarding the slice in question, the allowable diversion degree information being held for each of the plurality of slices; and a signal control unit configured to notify, in a case where resources of one of the plurality of slices are insufficient, the node to use resources of a slice different from the slice whose resources are insufficient, based on the allowable diversion degree information held by the slice information holding unit. The node transmits a signal regarding user data addressed to the slice whose resources are insufficient, to the resources of the slice different from the slice whose resources are insufficient, based on notification from the signal control unit.

A slice operation method according to an aspect of the present disclosure is a slice operation method performed by a slice operation device managing a plurality of slices each of which is a virtual network constructed on a network infrastructure and to each of which a service using the virtual network is allocated, the method including: a slice information holding step of holding allowable diversion degree information that is information on a resource amount which can be diverted to transmission and reception using a slice different from a slice in question, among resources regarding the slice in question, the allowable diversion degree information being held for each of the plurality of slices; and a signal control step of causing, in a case where resources of one of the plurality of slices are insufficient, resources of a slice different from the slice whose resources are insufficient, to be diverted to transmission and reception of a signal using the slice whose resources are insufficient, based on the allowable diversion degree information held by the slice information holding step.

Advantageous Effects of Invention

According to the present disclosure, a slice operation device, a communication system, and a slice operation method improved in utilization of resources allocated to a slice are provided.

BRIEF DESCRIPTION OF DRAWINGS

FIG. 3 is a diagram illustrating examples of requirement information held by a slice information holding unit of the slice subnet operation function.

DESCRIPTION OF EMBODIMENTS

Hereinafter, aspects for implementing the present disclosure will be described in detail with reference to the accompanying drawings. Note that in the description of the drawings, identical elements are denoted by identical reference signs, and overlapping descriptions are omitted.

Figure 1:
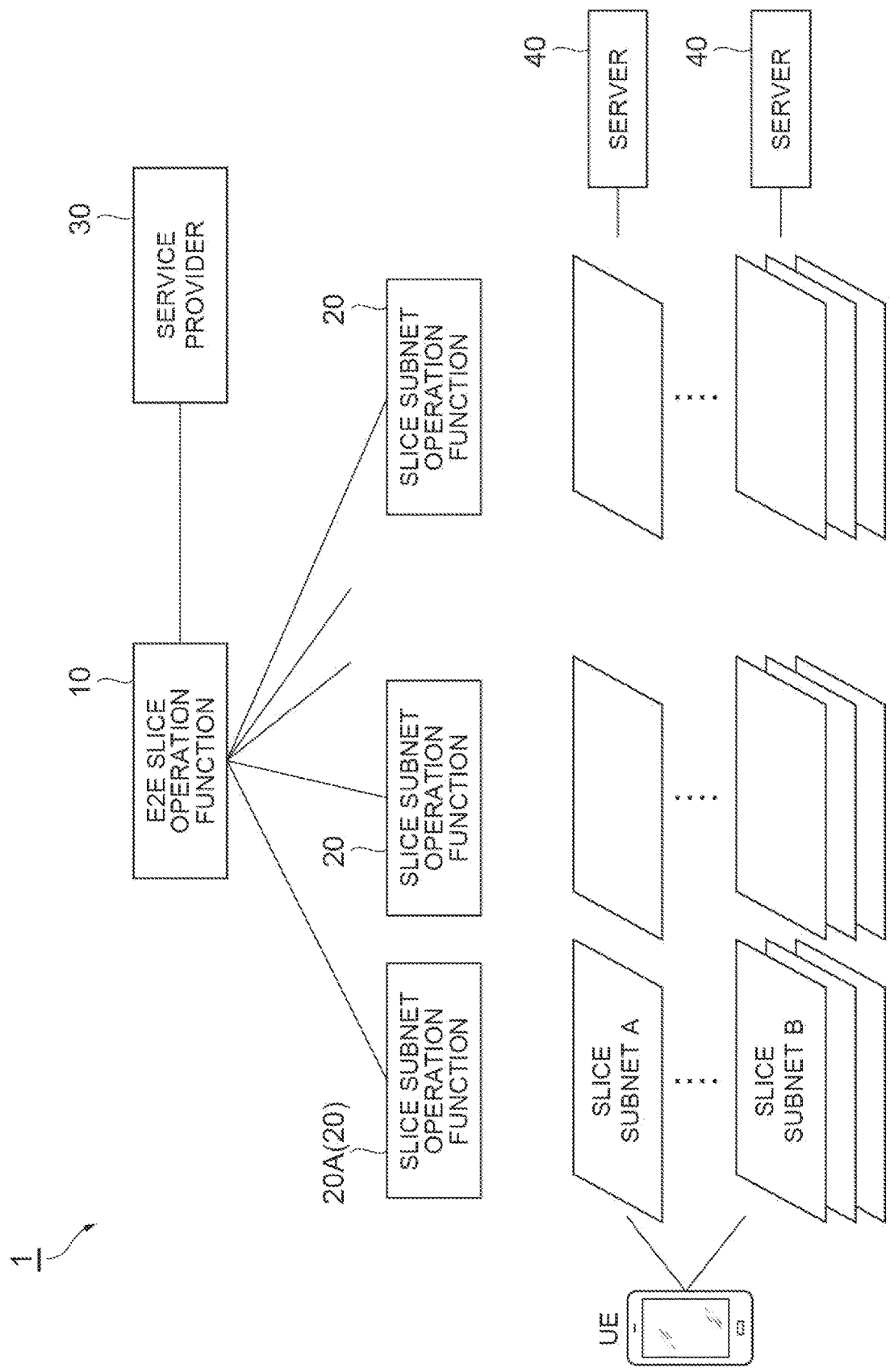
FIG. 1 is a diagram illustrating a configuration of a communication system including a slice operation device according to the present embodiment.

FIG. 1 illustrates a configuration of a communication system 1 including a slice operation device according one embodiment of the present disclosure. The communication system 1 according to the present embodiment is a system that provides, by using data communication, a network service to UE (User Equipment) that is a user terminal used by a user. The network service is a service using network resources such as a communication service (leased line service or the like) and an application service (video distribution, a service using a sensor device such as an embedded device). Note that the UE is, for example, a so-called user terminal, and includes portable terminals in general such as a smartphone and a tablet terminal. Note that the UE may be an in-vehicle terminal or the like.

The communication system 1 allocates a service to a slice, which is a virtualized network, and thus to provide a network service to the UE (User Equipment). The slice is a virtualized network or a service network that is logically constructed on a network infrastructure by virtually dividing link and node resources (resources) of a network device and coupling the divided resources, and resources in the slices are isolated from one another and do not interfere with one another.

Creation and management of a slice for each service can be realized by a network slice control technique based on a slice selection technique using a DCN (Dedicated Core Network) and a virtualization technique such as NFV (Network Function Virtualization)/SDN (Software Defined Network).

Slice control architecture utilizing NFV and SDN includes a physical/virtual resource layer constituting a network such as a physical server and a transport switch, a virtual network layer constituting a network slice having a function set necessary for providing a service on physical/virtual resources, and a service instance layer being the uppermost layer and managing a service instance provided to an end user. The physical/virtual resource layer is managed by, for example, VIM (Virtualized Infrastructure Manager) including SDN-C (SDN Controller). In addition, the virtual network layer is managed by, for example, VNFM (Virtual Network Function Manager) and NFVO (NFV Orchestrator) for each network slice. The VIM, the VNFM, and the NFVO are defined as MANO (Management & Orchestration) architecture. In addition, requirements of the service instance in the service instance layer is monitored and guaranteed by OSS/BSS (Operation Support System/Business Support System).

As a result of network slicing performed by the SDN-C and server resource slicing performed by the VIM, allocation of the physical/virtual resource layer is performed. In addition, VNGFM and the NFVO place a function set on the allocated resource slice. Then, the OSS/BSS monitors the network slice created in this manner. As a result, a slice corresponding to a service is created and managed.

In the communication system 1, some of nodes that realize communication necessary for the UE to use the service is provided on a slice which is a virtual network logically created on the network infrastructure. Therefore, the UE communicates through a route via the nodes and the like provided on the slice.

In addition, the communication system 1 is characterized in that when the UE communicates with a server that provides a service in order for the UE to use the service, the UE communicates via a multistage slice subnets selected according to the service. Specifically, the UE accesses and communicates with a service server which is a server providing the service, for example, via a node set in a RAN slice subnet provided in a radio access network (RAN), a node set in a TN slice subnet provided in a transport network (TN), and a node set in a CN slice subnet in a core network (CN). Therefore, the UE establishes a communication route between the UE and the service server via the RAN slice subnet, the TN slice subnet, and the CN slice subnet, which are three stages of slice subnets. In this manner, a status where so-called E2E (End-to-End) slicing is realized is illustrated in the communication system 1.

FIG. 1 illustrates a status where so-called E2E (End-to-End) slicing is realized by providing a plurality of stages of slice subnets between the UE and the server 40 providing the service. In addition, at each stage, a plurality of slice subnets are provided and set based on requirements (for example, delay, communication bandwidth) and the like required for services using the slice subnet in question.

In a case where the UE uses a specific service, the UE accesses and communicates with the slice subnet determined in advance according to the service. Therefore, for example, when the communication traffic volume for a specific service increases, most of the resources allocated to the slice subnet corresponding to the specific service are used in the slice subnet. In addition, in a case where communication exceeding the resources of the slice subnet occurs, there is a possibility that part of the communication may be restricted. Here, it is assumed that there is a plenty of resources of other slice subnets associated with services different from the above service. In such a case, an event that even though there are a plenty of resources in the slice subnets as a whole, some communication may be restricted since resources in the specific slice subnet are not sufficient may occur. Therefore, in the communication system 1 according to the present embodiment, a device that manages slice subnets performs control so that a slice subnet different from the slice subnet initially allocated can be used as necessary. In the following embodiment, a specific configuration and a procedure of the processes of the configuration will be described.

Each device included in the communication system 1 will be described. As illustrated in FIG. 1, the communication system 1 is configured to include an E2E slice operation function 10, a plurality of slice subnet operation functions 20, and a service provider 30 (service server).

The E2E slice operation function 10 has a function of setting a slice corresponding to a service, based on a slice setting request from the service provider 30. The E2E slice operation function 10 has a function of comprehensively managing multistage slice subnets provided between a terminal side (UE) and a service providing side (server 40). The service provider 30 is a device managed by a service provider or the like and has a function of notifying the E2E slice operation function 10 of service requirements. Based on the service requirements, the E2E slice operation function 10 individually sets slices corresponding to the service regarding both the RAN slice and the CN slice. Note that determination of the slice is also based on information on resources provided from the plurality of slice subnet operation functions 20. The E2E slice operation function 10 can be provided to, for example, NFVO defined as MANO Architecture. In addition, a configuration may be adopted in which the above function may be provided to a device having a newly defined slice management/selection function.

The slice subnet operation function 20 is provided correspondingly to each stage of multistage slice subnets provided between the terminal side (UE) and the service providing side (server 40) and has a function of comprehensively managing physical resources of the slice subnets. The physical resources used for constructing the slice subnet are managed by the slice subnet operation function 20. The slice subnet operation function 20 notifies the E2E slice operation function 10 of information on the physical resources that can be used for the slice subnets at the stage managed by the slice subnet operation function 20 and information on the usage status and the like of the physical resources. In addition, the slice subnet operation function 20 has a function of changing (creating, deleting, expanding, reducing, and the like) the slice subnet in the physical resource managed by the device having the slice subnet operation function 20, based on an instruction from the E2E slice operation function 10. The slice subnet operation function 20 changes the slice based on the instruction from the E2E slice operation function 10, and thus a slice subnet corresponding to the service is provided. Therefore, a slice subnet operation function 20A provided at the stage closest to the UE among the plurality of slice subnet operation functions 20 changes slice subnets A, B . . . illustrated in FIG. 1, but does not change the slice subnets at the subsequent stages.

The slice subnet operation function 20 may be configured to be provided to, for example, a device having a newly defined physical resource management function. In addition, a configuration may be adopted in which the VIM simultaneously manages virtual resources and physical resources regarding the slice subnet. In addition, for example, the function as the slice subnet operation function 20 may be provided to the VNFM, the VIM, or the like defined as the MANO Architecture.

Note that the functions regarding the E2E slice operation function 10 and the slice subnet operation function 20 may be contained in an identical device. In addition, each of the E2E slice operation function 10 and the slice subnet operation function 20 may be realized by a plurality of devices.

Figure 2:
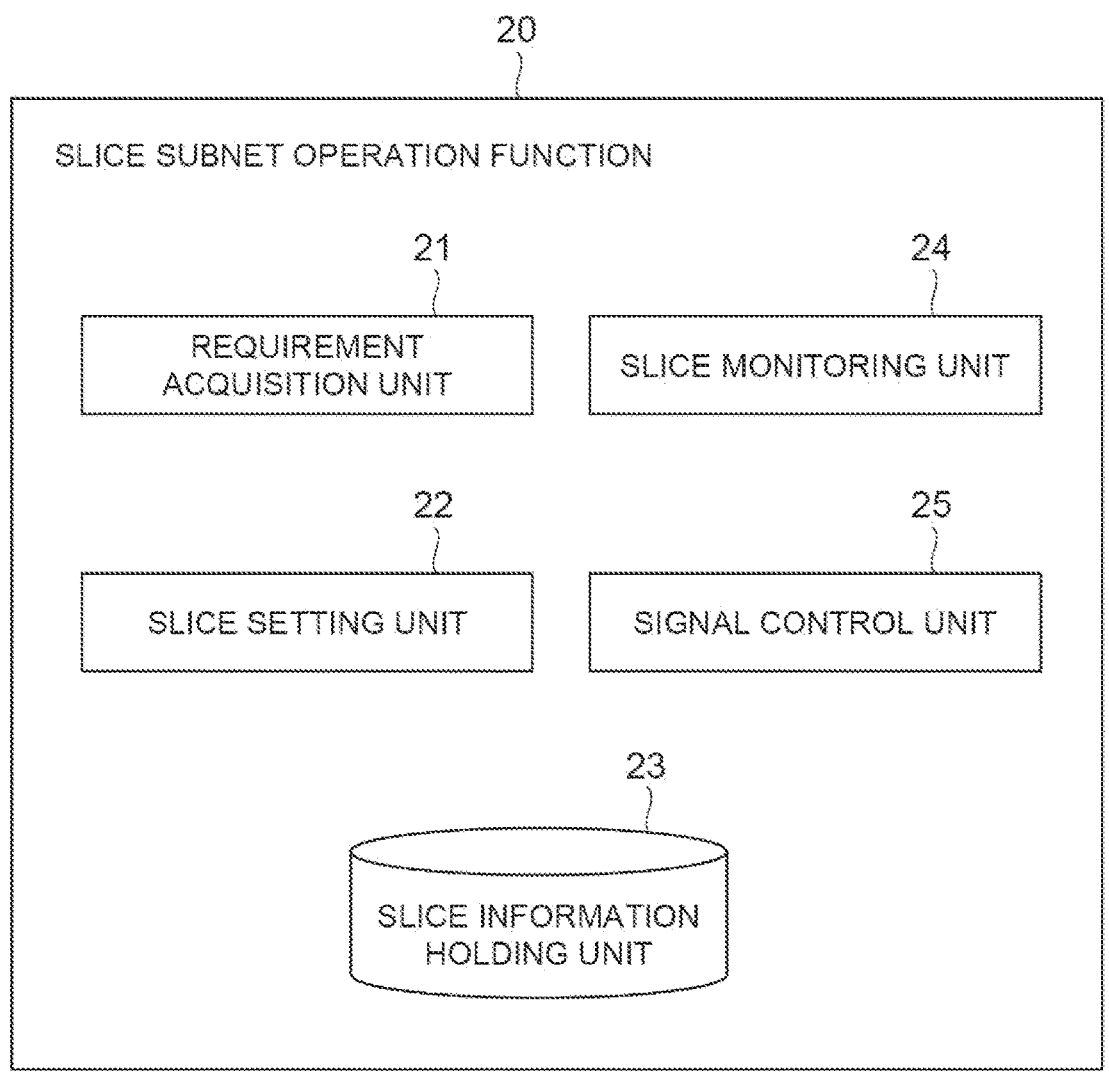
FIG. 2 is a diagram illustrating functional blocks of a slice subnet operation function corresponding to the slice operation device.

Next, the slice subnet operation function 20 will be described with reference to FIG. 2. The slice subnet operation function 20 is configured to include a requirement acquisition unit 21, a slice setting unit 22, a slice information holding unit 23, a slice monitoring unit 24, and a signal control unit 25.

The requirement acquisition unit 21 acquires information (requirement information) regarding requirements necessary for setting a slice subnet from the E2E slice operation function 10. The requirement information transmitted from the E2E slice operation function 10 is held in the slice information holding unit 23. In addition, the requirement acquisition unit 21 may also have a function of giving information (capacity, usage status, and the like of physical resources) on the slice subnets at each stage by communicating with the slice subnet operation function 20 as necessary.

FIG. 3 illustrates an example of the requirement information regarding setting of a slice subnet given in notification from the E2E slice operation function 10. The requirement information includes information for specifying conditions (requirements) necessary for setting a slice subnet and allowable diversion degree information serving as an index for determining whether or not the slice subnet can be diverted to other usage. In the example illustrated in FIG. 3, two pieces of information (SST, SD) included in S-NSSAI (Single Network Slice Selection Assistance Information) are indicated as information specifying the slice subnet. In addition, delay and a bandwidth are indicated as information specifying the requirements. In addition, as the allowable diversion degree information, the information specifying in percentage whether or not to allow diversion, that is, to allow the slice subnet in question to perform communication supposed to use another slice subnet, is indicated, the information being associated with each slice subnet.

The allowable diversion degree information is a parameter set in advance by the E2E slice operation function 10, based on characteristics, usage, or the like of each slice subnet. Specifically, the allowable diversion degree information specifies, for each slice subnet, the rate of resources that can be used for communication regarding another slice subnet among the allocated resources. Whether or not the resources can be used for communication on the premise of using another slice subnet depends on each slice subnet. For example, a slice subnet assumed to be used for a specific service may be difficult to divert to communication for other usage. The allowable diversion degree information is set in the service provider 30 in consideration of the circumstances for each slice subnet as described above. In the example illustrated in FIG. 3, the allowable diversion degree of the resources is set to 30% for the slice subnet specified by SST=1 and SD=-. Therefore, it is possible to divert 30% of the resources of this slice subnet to communication on the premise of using another slice subnet. In contrast, the allowable diversion degree of the resources is set to 0% for the slice subnet specified by SST=2 and SD=10. Therefore, diversion of resources is prohibited in this slice subnet. In this manner, the allowable diversion degree information is set for each slice subnet.

The allowable diversion degree information is provided as requirement information together with information regarding requirements from the service provider 30 via the E2E slice operation function 10. In the slice subnet operation function 20, also the allowable diversion degree information is held as requirement information in the slice information holding unit 23.

Returning to FIG. 2, the slice setting unit 22 has a function of setting a slice subnet based on the requirement information transmitted from the E2E slice operation function 10.

The slice information holding unit 23 has a function of holding the requirement information described above. Since the slice setting unit 22 sets a slice based on the requirement information, it can be said that the information held by the slice information holding unit 23 is information on characteristics of slice subnets controlled (managed) by the slice subnet operation function 20 including the slice information holding unit 23.

The slice monitoring unit 24 has a function of monitoring slice subnets controlled (managed) by the slice subnet operation function 20 including the slice information holding unit 23. For example, the slice monitoring unit 24 of the slice subnet operation function 20A illustrated in FIG. 1 monitors slice subnets A, B, and the like. The monitoring range of the slice monitoring unit 24 is not particularly limited; however, the slice monitoring unit 24 at least monitors the communication traffic volume in each slice subnet and checks whether or not resource shortage occurs in each slice subnet.

The signal control unit 25 has a function of instructing another node (adjacent node) to change the slice subnet to which the node transmits a signal, based on information held by the slice information holding unit 23, in a case where the slice monitoring unit 24 detects that resource shortage occurs in the slice subnet.

The adjacent node that transmits data to the slice subnet is a node that transmits a signal (U-Plane signal) regarding user data to one of the plurality of slice subnets managed by the slice subnet operation function 20. Specifically, examples of the adjacent node includes a slice subnet at the preceding stage or the subsequent stage of the slice subnet in question when the signal regarding user data is transmitted between the UE and the server 40 and another device provided on a data communication route between the UE and the server 40. For example, in the example illustrated in FIG. 1, the slice subnet managed by the slice subnet operation function 20 provided at the next stage (server 40 side) of the slice subnet A when viewed from the UE is the node adjacent to the slice subnet A.

The signal control unit 25 of the slice subnet operation function 20 determines the volume of communication (traffic) to be allocated to other slice subnets, based on information such as allowable diversion degree held in the slice information holding unit 23, in a case where resource shortage occurs in a specific slice subnet. Then, the signal control unit 25 notifies the node (adjacent node) that may transmit data to the specific slice subnet of information on the slice subnet to be the transmission destination, the allowed transmission traffic volume to each slice subnet, and the like. In this manner, the signal control unit 25 of the slice subnet operation function 20 performs control to prevent data transmitted from the adjacent node from concentrating on the specific slice subnet.

Next, the operation procedure of the slice subnets in the communication system 1 including the slice subnet operation function 20 will be described with reference to FIGS. 4 and 5.

Figure 4:
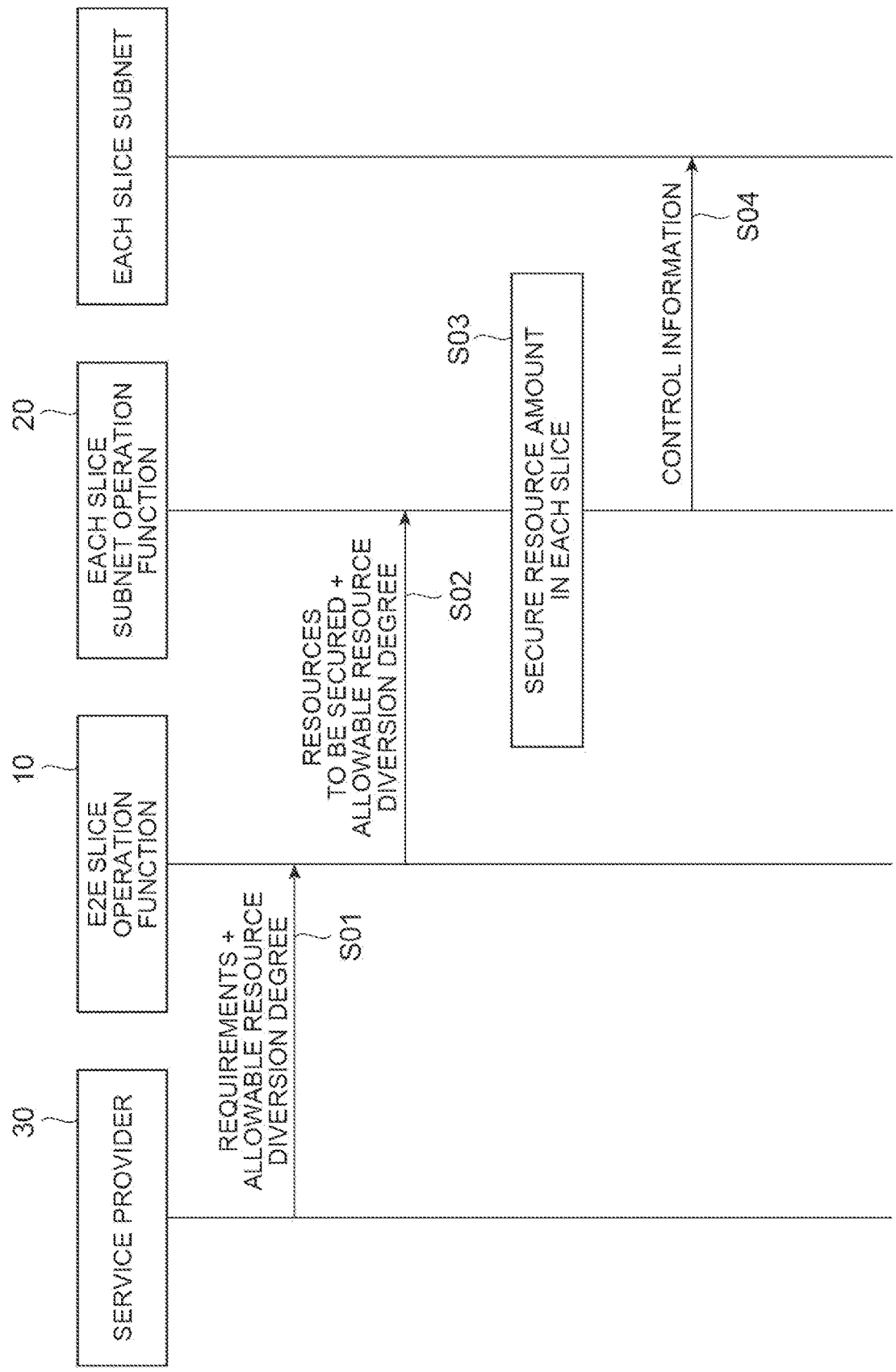
FIG. 4 is a sequence diagram illustrating processes of creating a slice subnet performed by the communication system.

FIG. 4 is a sequence diagram explaining a procedure for setting slice subnets. First, the service provider 30 transmits to the E2E slice operation function 10 requirements necessary for a service and allowable resource diversion degree information (S01). Based on the requirements from the service provider 30, the E2E slice operation function 10 obtains the resource amount and the like of a slice to be created under the control of the slice subnet operation function 20, and then, transmits to the slice subnet operation function 20 the information of the resource amount and the like as requirement information (S02).

In the slice subnet operation function 20, when the requirement acquisition unit 21 acquires the requirement information, this information is held in the slice information holding unit 23 (slice information holding step). In addition, the slice setting unit 22 secures the resource amount for newly providing a slice subnet under management (S03). The slice setting unit 22 transmits a control signal for providing a slice subnet under management (S04). As a result, a slice subnet based on the requirement information is created. In addition, the slice information holding unit 23 holds the information on the requirements and the allowable resource diversion degree information for each slice subnet.

Figure 5:
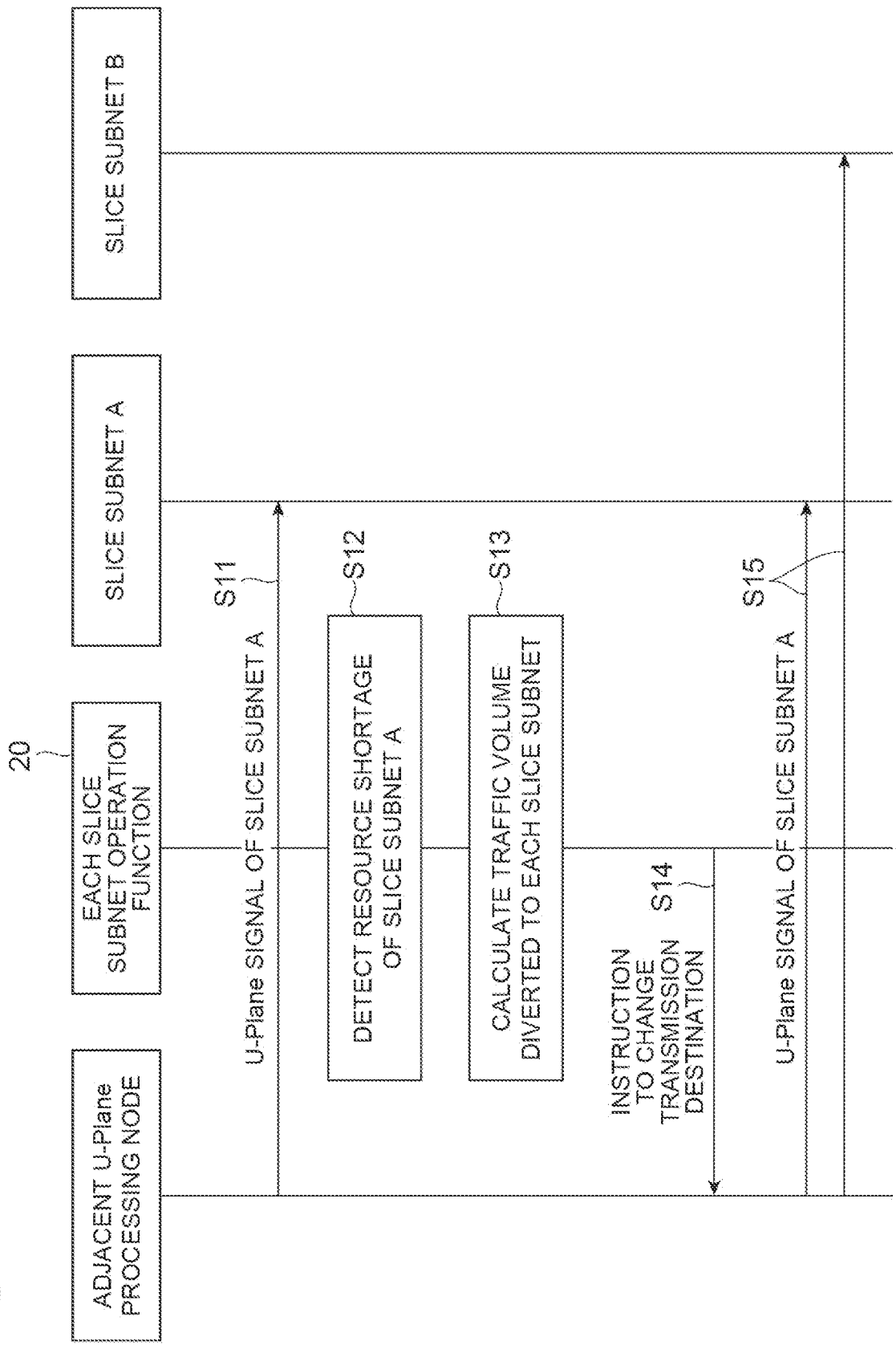
FIG. 5 is a sequence diagram illustrating processes of resource diversion in slice subnets performed by the communication system.

FIG. 5 is a sequence diagram explaining a procedure for diverting resources between slice subnets. First, a node adjacent to slice subnets managed by the slice subnet operation function 20 transmits a signal (U-Plane signal) regarding user data to a specific slice subnet (here, the slice subnet A) (S11). The slice monitoring unit 24 of the slice subnet operation function 20 monitors communication between the adjacent node and the slice subnets under management and checks whether there is resource shortage in each slice subnet.

Here, it is assumed that a situation where resources become insufficient occurs in the slice subnet A and the slice monitoring unit 24 of the slice subnet operation function 20 detects this situation (S12: signal control step). The signal control unit 25 is notified of occurrence of resource shortage in the slice subnet A. Based on this notification, the signal control unit 25 determines to allocate (divert) part of communication using the slice subnet A to another slice subnet and calculates the traffic volume (communication traffic volume) to be allocated to each slice subnet according to the allowable diversion degree information held in the slice information holding unit 23 (S13: signal control step). Then, based on the result, the signal control unit 25 transmits an instruction to change the transmission destination of the signal regarding the user data addressed to the slice subnet A, to the node (adjacent node) communicating with the slice subnet A (S14: signal control step). The content of the instruction to change the transmission destination can be appropriately changed. For example, it is possible to give an instruction to uniformly change the transmission destinations to a specific slice subnet (for example, slice subnet B). In addition, it is also possible to give an instruction to change the transmission destination to another slice subnet with respect to some of the signals regarding user data addressed to the slice subnet A.

Note that even though only one node (adjacent U-Plane signal processing node) communicating with the slice subnet A is illustrated in FIG. 5, there are actually a plurality of nodes communicating with the slice subnet A. The contents of instructions to change the transmission destination transmitted from the signal control unit 25 do not have to be uniform for all the nodes (adjacent nodes) communicating with the slice subnet A. For example, nodes provided between the slice subnet A and the UE among the adjacent nodes may be instructed to change the transmission destination to the slice subnet B, and nodes provided between the slice subnet A and the server 40 among the adjacent nodes may be instructed to change the transmission destination to a slice subnet different from the slice subnets A and B. In addition, a change of the transmission destination may be individually specified for each node.

Based on the instruction to change the transmission destination from the slice subnet operation function 20, the node (adjacent U-Plane signal processing node) communicating with the slice subnet A transmits a signal regarding user data addressed to the slice subnet A to the slice subnet A or another slice subnet based on the instruction (S15). FIG. 5 illustrates an example of transmitting a signal regarding user data addressed to the slice subnet A to both of the slice subnets A and B. In this manner, by transmitting the signal regarding the user data addressed to the slice subnet A also to the slice subnet different from the slice subnet A, resource shortage in the slice subnet A is resolved.

In this manner, the slice subnet operation function 20 serving as the slice operation device and the slice operation method according to the present embodiment include: the slice information holding unit 23 configured to hold allowable diversion degree information that is information on the resource amount which can be diverted to transmission and reception using a slice different from a slice in question, among resources regarding the slice in question, the allowable diversion degree information being held for each of the plurality of slices (slice subnets); and the signal control unit 25 configured to cause, in a case where resources of a slice among the plurality of slices are insufficient, resources of a slice which is different from the slice whose resources are insufficient to be diverted to transmission and reception of a signal using the slice whose resources are insufficient, based on the allowable diversion degree information held by the slice information holding unit 23.

In addition, in the communication system 1 having the above slice subnet operation function 20, based on the notification on the slice from the signal control unit 25, the node that transmits the signal regarding the user data to one of the plurality of slices managed by the slice subnet operation function 20 transmits the signal regarding the user data addressed to the slice whose resources are insufficient, to resources of a slice different from the slice whose resources are insufficient.

Due to the above configuration, in a case where resources of a specific slice are insufficient, the signal control unit 25 of the slice subnet operation function 20 instructs the node that transmits the signal regarding the user data to divert the resources of the slice different from the slice whose resources are insufficient, based on the allowable diversion degree information held in the slice information holding unit 23. Thus, the signal control unit 25 causes the resources of the slice different from the slice whose resources are insufficient to be diverted to transmission and reception of the signal using the slice whose resources are insufficient. By adopting such a configuration, it is possible to reduce occurrence of a situation where resources cannot be sufficiently used even though there are a plenty of resources in the slices as a whole, and it is possible to improve utilization of resources allocated to the slices.

Conventionally, in a case where resources of a specific slice are insufficient, it is conceivable to take measures such as changing allocation of resources to the specific slice. However, since there are other slices, resources that can be usually allocated to each slice are limited. In addition, in reality, it may not be easy to change resource allocation in a case where resources are temporarily insufficient in a specific slice. In contrast, according to the configuration described in the present embodiment, allowable diversion degree information is held for each of the plurality of slices, the allowable diversion degree information being information on a resource amount which can be diverted to transmission and reception using a slice different from a slice in question, among resources regarding the slice in question. In a case where resources of a specific slice are insufficient, a signal regarding the specific slice is transmitted and received by using resources of a slice different from the specific slice, based on the allowable diversion degree information. Due to such a configuration, even in a case where resources of a specific slice are insufficient, it is possible to transmit and receive a signal by diverting resources of another slice, and utilization of resources is improved. In addition, occurrence of communication restrictions and the like due to shortage of resources can be prevented, which will be more convenient for users.

Here, an aspect may be adopted where the allowable diversion degree information is information for specifying the ratio of the resource amount that can be diverted to the transmission and reception using a slice different from the slice in question among the resources regarding the slice in question. Due to such a configuration, in a case where resource shortage occurs in a specific slice, the amount of resources that can be diverted can be easily determined for each slice. Therefore, processes regarding resource diversion can be more easily performed. Therefore, resource utilization can be improved with a simpler procedure. Note that the allowable diversion degree information may not be a numerical information specifying the ratio of the resource amount that can be diverted, but may be, for example, numerical information specifying the resource amount itself that can be diverted. The format of the allowable diversion degree information is not limited to numerical information and can be changed as appropriate. In addition, depending on characteristics of the allowable diversion degree, the calculation method of the traffic volume and the like are also changed.

In addition, an aspect may be adopted where slices are provided at a plurality of stages of the communication route for performing communication between the user terminal that uses a service and the service server that provides the service, and the slice subnet operation function 20 serving as a slice operation device manages a plurality of slices in a specific stage of the plurality of stages. As described above, slices are provided at the plurality of stages, and the slice subnet operation function 20 performs control regarding resource diversion at the time of resource shortage as described above when the slices at the specific stage are managed. Thus, resources can be diverted between slices at an identical stage while resources of the slices at the plurality of stages between the user terminal and the service server are individually and appropriately managed. Therefore, it is possible to improve utilization of resources while reducing such a risk that resources regarding the slice at a specific stage are remarkably insufficient as compared with the resources of other stages.

Note that in the above embodiment, a configuration (FIG. 4) has been described where in a case of newly setting a slice, requirement information is transmitted from the E2E slice operation function 10, and the slice information holding unit 23 holds allowable diversion degree information included in the requirement information. However, concerning slice setting, the configuration can be applied not only upon introduction of a new service but also upon a change in service requirements from an existing service. In addition, there may be a case where allowable diversion degree information in which the value of the allowable diversion degree or the like is updated may be transmitted again from the E2E slice operation function 10. In such a case, a configuration is sufficient where in the slice subnet operation function 20, information held in the slice information holding unit 23 is updated every time the requirement acquisition unit 21 acquires the requirement information. In addition, a configuration may be possible where the allowable diversion degree information is transmitted from a device different from the E2E slice operation function 10 to the slice subnet operation function 20. That is, the creation source and the transmission source of the allowable diversion degree information are not limited to the E2E slice operation function 10.

In addition, in the above embodiment, an example in which slices are provided at a plurality of stages in the communication route has been described. However, the number of slices (the number of stages of slices provided on a communication route) can be appropriately changed. In addition, the number of stages at which slices are provided may be one. In a case where slices are provided at a plurality of stages in a communication route, the slice subnet operation function 20 is provided separately for each stage as illustrated in FIG. 1. However, a configuration may be possible where a slice subnet operation function 20 collectively manages a plurality of stages.

In addition, in the above embodiment, a case where a slice (slice subnet) is provided in the radio access network has been described; however a slice can also be provided in a wired access network. That is, a configuration may be possible in which when a user terminal uses a service, communication may be performed via a slice provided in the wired access network and a slice provided in a core network.

<Hardware Configuration>

Note that the block diagrams used in the description of the above embodiment illustrates blocks in units of functions. These functional blocks (components) are realized by any combination of at least one of hardware and software. In addition, the method of realizing each functional block is not particularly limited. That is, each functional block may be realized by using one physically or logically coupled device, or may be realized by directly or indirectly (for example, using a cable, radio, or the like) connecting two or more devices physically or logically separated and using the plurality of devices. The functional block may be realized by combining software with the above one device or the plurality of above devices.

The functions include determining, determining, judging, calculating, computing, processing, deriving, investigating, looking up, ascertaining, receiving, transmitting, outputting, accessing, resolving, selecting, choosing, establishing, comparing, assuming, expecting, considering, broadcasting, notifying, communicating, forwarding, configuring, reconfiguring, allocating, mapping, assigning, and the like. However, the functions are not limited to them. For example, a functional block (component) that enables transmission is called a transmitting unit or a transmitter. In any case, as described above, the realization method is not particularly limited.

Figure 6:
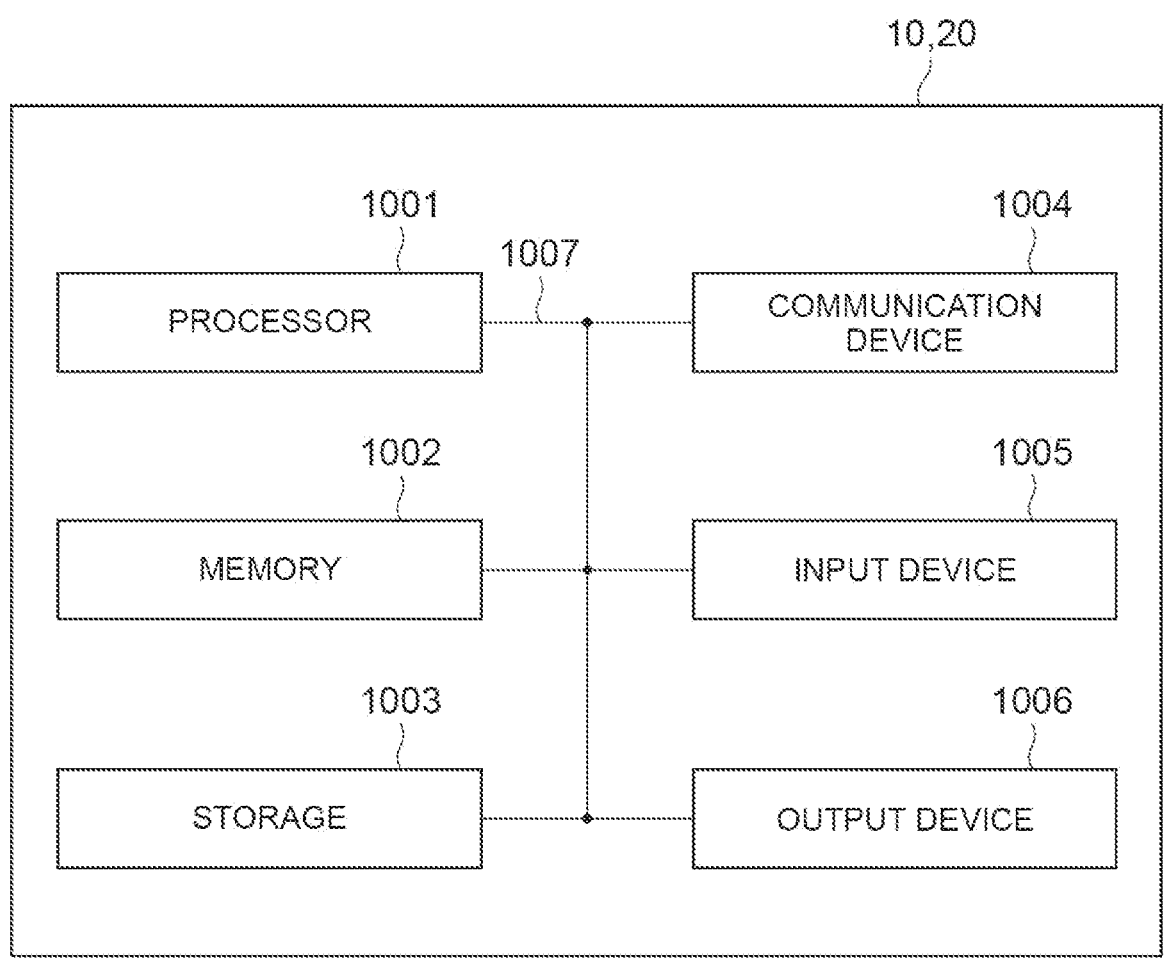
FIG. 6 is a diagram illustrating an example of a hardware configuration such as the slice subnet operation function according to the present embodiment.

For example, the UE, the E2E slice operation function 10, the slice subnet operation function 20, or the like according to an embodiment of the present disclosure may function as a computer that performs processes of the communication method of the present disclosure. FIG. 6 is a diagram illustrating an example of a hardware configuration of a base station and the user terminal according to an embodiment of the present disclosure. Each of the UE, the E2E slice operation function 10, and the slice subnet operation function 20 described above may be physically configured as a computer device including a processor 1001, a memory 1002, a storage 1003, a communication device 1004, an input device 1005, an output device 1006, a bus 1007, and the like.

Note that in the following description, the expression "device" can be replaced with a circuit, device, unit, or the like. The hardware configuration of each of the UE, the E2E slice operation function 10, and the slice subnet operation function 20 may be configured to include one or a plurality of the devices illustrated in the figure, or may be configured without including some of the devices.

Each function of each device included in the communication system 1 is realized by causing predetermined software (program) to be loaded into the hardware such as the processor 1001 and the memory 1002 so that the processor 1001 performs computation and controls communication performed by the communication device 1004 or controls at least one of reading and writing of data from and to the memory 1002 and the storage 1003.

The processor 1001 operates, for example, an operating system to control the entire computer. The processor 1001 may be configured of a central processing unit (CPU) including an interface with a peripheral device, a control device, a computing device, a register, and the like. For example, the baseband signal processing unit 104, the call processing unit 105 described above and the like may be realized by the processor 1001.

In addition, the processor 1001 causes a program (program code), a software module, data, and the like to be loaded from at least one of the storage 1003 and the communication device 1004 into the memory 1002, and executes various processes according to them. As the program, a program causing the computer to execute at least some of the operations described in the embodiment described above is used. For example, the signal control unit 25 of the slice subnet operation function 20 may be realized by a control program that is stored in the memory 1002 and operates in the processor 1001. Other functional blocks may be similarly realized. Even though it has been described that various processes described above are executed by one processor 1001, the various processes may be executed simultaneously or sequentially by two or more processors 1001. The processor 1001 may be implemented as one or more chips. Note that the program may be transmitted from a network through a telecommunications line.

The memory 1002 is a computer-readable recording medium and may be configured of at least one of a ROM (Read Only Memory), an EPROM (Erasable Programmable ROM), an EEPROM (Electrically Erasable Programmable ROM), a RANI (Random Access Memory), and the like, for example. The memory 1002 may be referred to as a register, a cache, a main memory (main storage device), or the like. The memory 1002 can store a program (program code), a software module, and the like which can be executed for performing the radio communication method according to an embodiment of the present disclosure.

The storage 1003 is a computer-readable recording medium and may be configured of at least one of an optical disk such as a CD-ROM (Compact Disc ROM), a hard disk drive, a flexible disk, a magneto-optical disk (for example, a compact disk, a digital versatile disk, a Blu-ray (registered trademark) disk), a smart card, a flash memory (for example, a card, a stick, a key drive), a floppy (registered trademark) disk, a magnetic strip, and the like, for example. The storage 1003 may be referred to as an auxiliary storage device. The storage medium described above may be an appropriate medium such as a database, a server, or the like including at least one of the memory 1002 and the storage 1003.

The communication device 1004 is hardware (transmission and reception device) for performing communication between computers through at least one of a wired network and a wireless network, and is also referred to as a network device, a network controller, a network card, a communication module, or the like, for example. The communication device 1004 may be configured to include, for example, a high-frequency switch, a duplexer, a filter, a frequency synthesizer, and the like in order to realize at least one of frequency division duplex (FDD) and time division duplex (TDD). For example, the transmission and reception antenna 101, the amplifier unit 102, the transmitting and receiving unit 103, the transmission line interface 106, and the like described above may be realized by the communication device 1004. The transmitting and receiving unit 103 may be implemented so as to be physically or logically separated into a transmitting unit 103*a* and a receiving unit 103*b*.

The input device 1005 is an input device (for example, a keyboard, a mouse, a microphone, a switch, a button, a sensor, or the like) that receives an input from the outside. The output device 1006 is an output device (for example, a display, a speaker, a LED lamp, or the like) that performs output to the outside. Note that a configuration may be possible in which the input device 1005 and the output device 1006 are integrated (for example, a touch panel).

In addition, the respective devices such as the processor 1001 and the memory 1002 are connected by the bus 1007 for communicating information. The bus 1007 may be configured by using a single bus or may be configured by using different buses between respective devices.

In addition, each of the UE, the E2E slice operation function 10, and the slice subnet operation function 20 may be configured to include hardware such as a microprocessor, a digital signal processor (DSP), an ASIC (Application Specific Integrated Circuit), a PLD (Programmable Logic Device), a FPGA (Field Programmable Gate Array), or the like, and some or all of the functional blocks may be realized by the hardware. For example, the processor 1001 may be implemented by using at least one of the above examples of the hardware.

<Others>

Information notification is not limited to the aspect/ embodiment described in the present disclosure, and may be performed by using another method. For example, information notification may be performed by physical layer signaling (for example, DCI (Downlink Control Information), UCI (Uplink Control Information)), upper layer signaling (for example, RRC (Radio Resource Control) signaling, MAC (Medium Access Control) signaling), notification information (MIB (Master Information Block), SIB (System Information Block))), other signals, or a combination thereof. In addition, the RRC signaling may be referred to as a RRC message, and may be, for example, a RRC Connection Setup message, a RRC Connection Reconfiguration message, or the like.

Each aspect/embodiment described in the present disclosure can be applied to at least one of LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (new Radio), W-CDMA (registered trademark), GSM (registered trademark), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), a system using another appropriate system, and a next-generation system extended according to them. In addition, a plurality of systems may be combined and applied (for example, a combination of at least one of LTE and LTE-A and 5G, or the like).

As long as there is no inconsistency, the order in which the processing procedure, the sequence, the flowcharts, or the like is performed in each aspect/embodiment described in the present disclosure may be changed. For example, regarding the method described in the present disclosure, elements of various steps are presented by using an exemplary order and is not limited to the specific order presented.

The specific operation that is performed by the base station in the present disclosure may be performed by an upper node in some cases. In a network configured of one or more network nodes having a base station, it is apparent that various operations performed for communication with a terminal can be performed by at least one of the base station and another network node (for example, MME, S-GW, or the like is possible but not limited to them) other than the base station. A case where there is one network node other than the base station has been described above as an example; however, there may be a combination of a plurality of other network nodes (for example, MME and S-GW).

Information or the like can be output from an upper layer (or a lower layer) to the lower layer (or the upper layer). Information or the like may be input and output via a plurality of network nodes.

Information or the like that has been input or output may be stored in a specific place (for example, the memory), or may be managed by using a management table. Information or the like to be input or output can be overwritten, updated, or added. Information or the like that has been output may be deleted. Information or the like that has been input may be transmitted to another device.

Judging may be performed by using a value (0 or 1) represented by 1 bit, may be performed by using a Boolean value (true or false), or may be performed by using numerical comparison (for example, comparison with a predetermined value).

Each aspect/embodiment described in the present disclosure may be used alone or in combination, or may be used by being switched over in accordance with execution. In addition, notification of predetermined information (for example, notification of "being X") is not limited to being made explicitly, and may be made implicitly (for example, notification of the predetermined information is not made).

Although the present disclosure is described in detail in the foregoing, it is apparent to those skilled in the art that the present disclosure is not limited to the embodiment described in the present disclosure. The present disclosure can be implemented as a modified and changed aspect without deviating from the spirit and scope of the present disclosure defined by the Claims. Accordingly, the description of the present disclosure is given by way of illustration and does not have any restrictive meaning to the present disclosure.

Software should be interpreted widely so as to mean an instruction, an instruction set, a code, a code segment, a program code, a program, a sub-program, a software module, an application, a software application, a software package, a routine, a sub-routine, an object, an executable file, a thread of execution, a procedure, a function, and the like regardless of whether software may be referred to as software, firmware, middleware, microcode, hardware description language or referred to as another name.

In addition, software, an instruction, information, and the like may be transmitted and received via a transmission medium. For example, in a case where software is transmitted from a website, a server, or another remote source by using at least one of a wired technology (a coaxial cable, a fiber optic cable, a twisted-pair wire, a digital subscriber line (DSL), or the like) and wireless technology (infrared rays, microwaves, or the like), at least one of these wired and wireless technologies is included within the definition of the transmission medium.

Information, signals, and the like described in the present disclosure may be represented by using any of various different techniques. For example, data, an instruction, a command, information, a signal, a bit, a symbol, a chip, and the like that can be mentioned throughout the above description may be represented by a voltage, a current, an electromagnetic wave, a magnetic field or a magnetic particle, or a photo field or a photon, or any combination thereof.

Note that the terms described in the present disclosure and terms necessary for understanding the present disclosure may be replaced with terms having identical or similar meanings. For example, at least one of the channel and the symbol may be a signal (signaling). In addition, the signal may be a message. In addition, a component carrier (CC) may be referred to as a carrier frequency, a cell, a frequency carrier, or the like.

The terms "system" and "network" used in the present disclosure are used interchangeably.

In addition, information, parameters, and the like described in the present disclosure may be expressed by using an absolute value, may be expressed by using a relative value from a predetermined value, or may be expressed by using other corresponding information. For example, radio resources may be indicated by an index.

The names used for the parameters described above are not restrictive names in any respect. Further, mathematical expressions and the like using these parameters may be different from those explicitly disclosed in the present disclosure. Since various channels (for example, PUCCH, PDCCH, and the like) and information elements can be identified by any suitable names, various names allocated to these various channels and information elements are not restrictive in any way.

In the present disclosure, terms such as "base station (BS)", "radio base station", "fixed station", "NodeB", "eNodeB (eNB)", "gNodeB (gNB), "access point", "transmission point", "reception point", "transmission/reception point", "cell", "sector", "cell group", "carrier", "component carrier", and the like can be used interchangeably. The base station may also be referred to as a term such as a macrocell, a small cell, a femtocell, a picocell, or the like.

The base station can accommodate one or a plurality of (for example, three) cells. In a case where the base station accommodates a plurality of cells, the entire coverage area of the base station can be divided into a plurality of smaller areas, each smaller area can also provide communication service by using a base station subsystem (for example, a small base station (RRH: Remote Radio Head) for indoor use). The term "cell" or "sector" indicates part or the entirety of the coverage area of at least one of the base station and the base station subsystem that performs communication service in this coverage.

In the present disclosure, the terms "mobile station (MS)", "user terminal", "user equipment (UE)", "terminal" and the like can be used interchangeably.

The mobile station may be referred to by those skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms.

At least one of the base station and the mobile station may be referred to as a transmission device, a reception device, a communication device, or the like. Note that least one of the base station and the mobile station may be a device mounted on a mobile body, a mobile body itself, or the like. The mobile body may be a vehicle (for example, a car, an airplane, or the like), a mobile body that moves in an unmanned manner (for example, a drone, a self-driving car, or the like), or a robot (manned type or an unmanned type). Note that at least one of the base station and the mobile station includes also a device which does not necessarily move during communication operation. For example, at least one of the base station and the mobile station may be an IoT (Internet of Things) device such as a sensor.

In addition, the base station in the present disclosure may be replaced with a user terminal. For example, each aspect/embodiment of the present disclosure may be applied to a configuration in which communication between a base station and a user terminal is replaced with communication between a plurality of user terminals (for example, may be referred to as D2D (Device-to-Device), V2X (Vehicle-to-Everything), or the like). In this case, a configuration may be adopted in which the user terminal may have the function that the base station described above has. In addition, expressions such as "uplink" and "downlink" may also be replaced with an expression corresponding to inter-terminal communication (for example, "side"). For example, an uplink channel, a downlink channel, or the like may be replaced with a side channel.

Similarly, the user terminal in the present disclosure may be replaced with a base station. In this case, a configuration may be adopted in which the base station has the function that the user terminal described above has.

The terms "determining (judgement)" and "determining (decision)" used in the present disclosure may encompass a wide variety of operations. For example, "determining" as judgement or "determining" as decision can include considering judging, calculating, computing, processing, deriving, investigating, looking up, search, inquiry, (for example, looking up in a table, a database, or another data structure), ascertaining, or the like, to be determined or determined. In addition, "determining (judgement)" and "determining (decision)" can include considering receiving (for example, receiving information), transmitting (for example, transmitting information), input, output, or accessing (for example, accessing data in the memory), to be determined or determined. In addition, "determining" as judgement and "determining" as decision can include considering resolving, selecting, choosing, establishing, comparing, or the like, to be determined or determined. That is, "determining (judgement)" and "determining (decision)" can include considering a certain operation to be "determining (judgement)" and "determining (decision)". In addition, "determining (judgement)" and "determining (decision)" may be replaced with "assuming", "expecting", "considering", or the like.

The terms "connected" and "coupled" or every transformation of these terms mean every direct or indirect connection or coupling between two or more elements, and may include a case where there are one or more intermediate elements between two elements that are "connected" or "coupled" to each other. Coupling or connection between elements may be a physical coupling or connection, logical coupling or connection, or a combination thereof. For example, "connecting" may be replaced with "accessing". In a case of being used in the present disclosure, it can be considered that two elements are "connected" or "coupled" to each other by using at least one of one or more electric wires, cables, and printed electric connections, and as several non-definitive and non-comprehensive examples, by using electromagnetic energy having a wavelength of a radio frequency region, a microwave region, and an optical (both visible and invisible) region.

The phrase "based on" used in the present disclosure does not mean "based only on" unless otherwise stated. In other words, the phrase "based on" means both "based only on" and "based at least on".

In a case where "include", "including", and transformation of them are used in the present disclosure, those terms are intended to be comprehensive like the term "comprising". In addition, the term "or" used in the present disclosure is not intended to be exclusive OR.

In the present disclosure, in a case where an article such as a, an, and the like in English is added by translation, the present disclosure may include a case where the noun following the article is plural.

In the present disclosure, the expression "A and B are different" may mean "A and B are different from each other". Note that that the expression may mean "each of the A and B is different from C". Terms such as "separate", "coupled", and the like may also be interpreted similarly to "different".

REFERENCE SIGNS LIST

1 Communication system
10 E2E slice operation function
20 Slice subnet operation function
21 Requirement acquisition unit
22 Slice setting unit
23 Slice information holding unit
24 Slice monitoring unit
25 Signal control unit
30 Service provider

The invention claimed is:

1. A slice operation device of a plurality of slice operation devices that manages one or more slice subnets of a plurality of slice subnets, wherein each slice subnet of the plurality of slice subnets is a virtual network with isolated resources for providing a service allocated to the slice subnet, and wherein each of the plurality of slice subnets are provided at one of a plurality of stages of a communication route between a user terminal and a server, the slice operation device comprising:
a memory that holds information including allowable diversion degree information for each of the plurality of slice subnets in advance,
where the allowable diversion degree information for a given slice subnet of the plurality of slice subnets is information on a resource amount, among resources associated with the given slice subnet, that can be diverted from the given slice subnet to a different slice subnet; and
a processor that:
monitors a communication between a node adjacent to the slice operation device and a first slice subnet of the one or more slice subnets under management of the slice operation device, wherein the communication is a signal communicated between the user terminal using a first service and a server providing the first service, and wherein the first slice subnet has been allocated the first service;
determines the first slice subnet has insufficient resources for transmission and reception of the signal; and
transmits a notification to the node to use resources of a second slice subnet associated with a service that is different from the first slice subnet based on the allowable diversion degree information of the second slice subnet held by the memory, wherein the notification causes the node to divert the signal addressed to the first slice subnet to the second slice subnet, and
wherein each stage of the plurality of stages is managed by a different one of the plurality of slice operation devices.

2. The slice operation device according to claim 1, wherein the allowable diversion degree information for the given slice subnet is information for specifying a ratio of the resource amount that can be diverted from the given slice subnet among the resources associated with the given slice subnet.

3. The slice operation device according to claim 1, wherein the processor controls the second slice subnet so that the second slice subnet processes a data amount that can be diverted, the data amount being indicated by the allowable diversion degree information.

4. The slice operation device according to claim 3, wherein the processor controls a flow rate by sending an instruction to the node to change a transmission destination.

5. The slice operation device according to claim 4, wherein in a case where the plurality of slice subnets are arranged in series, the node is a slice that is a source of data.

6. The slice operation device according to claim 3, wherein the processor is further configured to monitor an amount of traffic flowing through the plurality of slice subnets, wherein the processor further determines a shortage of resources based on the monitoring of the amount of traffic flowing through the plurality of slice subnets.

7. A communication system comprising:
a plurality of slice operation devices that each manage one or more slice subnets of a plurality of slice subnets, wherein each slice subnet of the plurality of slice subnets is a virtual network with isolated resources for providing a service allocated to the slice subnet, wherein each of the plurality of slice subnets are provided at one of a plurality of stages of a communication route between a user terminal and a server, and wherein each of the plurality of stages is managed by a different one of the plurality of slice operation devices; and
a node adjacent to a first slice operation device of the plurality of slice operation devices, wherein the node transmits a signal communicated between the user terminal using a first service and a server providing the first service, the signal transmitted to a first slice subnet which has been allocated the first service and which is managed by the first slice operation device,
wherein the first slice operation device includes:
a memory that holds information including allowable diversion degree information for each of the plurality of slice subnets set in advance,
where the allowable diversion degree information for a given slice subnet of the plurality of slice subnets is information on a resource amount, among resources associated with the given slice subnet, that can be diverted from the given slice subnet to a different slice subnet; and
a processor that:
monitors communication between the node and the one or more slice subnets under management of the first slice operation device;
determines the first slice subnet has insufficient resources for transmission and reception of the signal; and
transmits a notification to the node to use resources of a second slice subnet associated with a service that is different from the first slice subnet, based on the allowable diversion degree information of the second slice subnet held by the memory, and
wherein the node diverts transmission of the signal addressed to the first slice subnet to the second slice subnet in response to the notification from the processor.

8. A slice operation method performed by a first slice operation device of a plurality of slice operation devices, the first slice operation device managing one or more slice subnets of a plurality of slice subnets, wherein each slice subnet of the plurality of slice subnets is a virtual network with isolated resources for providing a service allocated to the slice subnet, wherein each of the plurality of slice subnets are provided at one of a plurality of stages of a communication route between a user terminal and a server, and wherein each of the plurality of stages is managed by a different one of the plurality of slice operation devices, the method comprising:

holding, in a memory, information including allowable diversion degree information for each of the plurality of slice subnets set in advance, where the allowable diversion degree information for a given slice subnet of the plurality of slice subnets is information on a resource amount, among resources associated with the given slice subnet, that can be diverted from the given slice subnet to a different slice subnet;

monitoring a communication between a node adjacent to the first slice operation device and a first slice subnet of the one or more slice subnets under management of the first slice operation device, wherein the communication is a signal communicated between the user terminal using a first service and a server providing the first service, and wherein the first slice subnet has been allocated the first service;

determining the first slice subnet has insufficient resources for transmission and reception of the signal; and transmitting a notification to the node to use resources of a second slice subnet associated with a service that is different from the first slice subnet based on the allowable diversion degree information of the second slice subnet in the memory, wherein the notification causes the node to divert the signal addressed to the first slice subnet to the second slice subnet.

\* \* \* \* \*